United States Patent [19]

Rijnsburger

[11] Patent Number: 4,907,216
[45] Date of Patent: Mar. 6, 1990

[54] OPTICAL RECORD CARRIER HAVING POSITION INDENTIFYING TRACK MODULATION

[75] Inventor: Johan M. Rijnsburger, Eindhoven, Netherlands

[73] Assignee: U. S. Philips Corporation, New York, N.Y.

[21] Appl. No.: 130,812

[22] Filed: Dec. 9, 1987

[30] Foreign Application Priority Data

Jul. 10, 1987 [NL] Netherlands .................. 8701632

[51] Int. Cl.$^4$ .............................................. H04N 5/85
[52] U.S. Cl. ................................. 369/275; 369/276
[58] Field of Search ............. 346/160, 154, 107 R, 346/108; 358/342; 364/100, 111, 124, 54, 60, 275-277

[56] References Cited

U.S. PATENT DOCUMENTS 4,736,258 4/1988 Noble et al. ................. 369/275

FOREIGN PATENT DOCUMENTS 0166144 1/1986 European Pat. Off. ........... 369/275
20642604 6/1981 United Kingdom ............. 369/275

OTHER PUBLICATIONS

Patent Abstracts of Japan, vol. 6, No. 252 (p.-161), (1130) Dec. 1982 57-147139 10 Sep. 82.
Patent Abstracts of Japan vol. 11 No. 230 (p.-599) (267) 28 Jul. 1987 Sony 624339.

Primary Examiner—Arthur G. Evans
Attorney, Agent, or Firm—Algy Tamoshunas; Leroy Eason

[57] ABSTRACT

A system for recording and/or reading an information signal ($V_i$) on an elongated track (4) of an optically readable record carrier (1). A position-identifying signal ($V_p$) which is synchronous with a clock signal is recorded on the track 4 by modulating the transverse excursion of the track, the signal $V_p$ indicating the instantaneous position along the track at which the information signal $V_i$ is located. The frequency band of the position-identifying signal $V_p$ is situated substantially outside the frequency band of the information signal $V_i$. In manufacturing such a record carrier, the deflection of a recording beam of radiation in a direction substantially transverse to the track is modulated by the position-information signal $V_p$.

16 Claims, 5 Drawing Sheets

OPTICAL RECORD CARRIER HAVING POSITION INDENTIFYING TRACK MODULATION

BACKGROUND OF THE INVENTION

1. Field of the Invention

The invention relates to a system for recording and/or reading an information signal on a track of an optically readable record carrier on which track a position-identifying signal which is synchronous with a clock signal is recorded by modulation of the track in accordance with the position-identifying signal. The system comprises optical scanning means for scanning the track with a radiation beam, an optical detector for detecting the radiation beam reflected by the track and for generating a detection signal which is representative of the modulation of the radiation beam caused by the track modulation, and a detection circuit for extracting the position-identifying signal from the detection signal.

The invention also relates to such a record carrier and to a method and apparatus for manufacture thereof.

2. Description of the Related Art

A system as described above is disclosed in British patent specification GB No. 2,069,219, which corresponds to pending U.S. application Ser. No. 110,063, which is a continuation of U.S. application Ser. No. 134,392, now abandoned, all of which are assigned to the present assignee.

The system described therein utilizes a record carrier in the form of an optically readable disc provided with a spiral grooved track comprising information areas which alternative with synchronization areas. The information areas are for recording information, whilst the synchronization areas provide control information for controlling the recording process by means of a preformed track modulation. This control information comprises inter alia position information in the form of an address of an information area adjoining the synchronization area. If by means of the recording and/or read apparatus information is to be recorded in an information area having a specific address, the addresses of the adjoining synchronization areas are read by scanning the synchronization areas with the radiation beam. The information area where the information is to be recorded is located with the aid of the addresses thus read.

Although a specific track portion in which the information signal is to be recorded can be located by means of this known system, it has the drawback that the successive information areas are interrupted by the synchronization areas.

This is a disadvantage, particularly if EFM-modulated information is to be recorded. For in such recording an uninterrupted information area is desirable.

SUMMARY OF THE INVENTION

It is an object of the invention to provide means which enable recording in uninterrupted information areas of tracks on an optical record carrier and which during scanning of the record carrier enable the location of the part of the record carrier being scanned to be derived from the radiation beam reflected from the record carrier.

In a system in accordance with the invention the track modulation corresponding to the position-identifying signal is situated at the location of the information area, and the frequency spectrum of such signal is substantially outside the frequency spectrum of the information signal.

In an embodiment of the system, detection circuit for extracting the position-identifying signal from the signal detected from the track comprises a filter having a pass band which substantially corresponds to the frequency spectrum of the position-identifying signal. This enables such signal to be derived from the detection signal very simply.

During reading of the position-identifying signal, control of the scanning velocity is desirable. To this end an embodiment of the system is characterized in that the recording and/or read apparatus comprises a clock-regeneration circuit for recovering the clock signal from the position-identifying signal and a control circuit for controlling the scanning velocity at a value such that the frequency of the recovered clock signal is equal to a reference frequency, the frequency spectrum of the position-identifying signal being situated substantially outside the frequency band employed for velocity control. A type of modulation which is very suitable for the position-identifying signal, and for which the frequency spectrum of the information signal exhibits substantially no frequency components in the low-frequency band utilized for velocity control, is "biphase" modulation or "biphase-mark" modulation.

For recording the position-identifying signal various types of track modulations may be used. If, as is customary, the information to be recorded on the track is recorded in the form of recording marks having a reflectivity which differs from the surrounding area, the track modulation may be in the form of a transverse track undulation whose amplitude of excursion relative to the track corresponds to the value of the position-identifying signal. This yields a very satisfactory signal separation between the position-identifying signal and the information signal.

BRIEF DESCRIPTION OF THE DRAWINGS

Embodiments of the invention and further advantages thereof will now be described in more detail, by way of example, with reference to FIGS. 1 to 11, of which

DESCRIPTION OF THE PREFERRED EMBODIMENTS

Figures 1A, 1B:
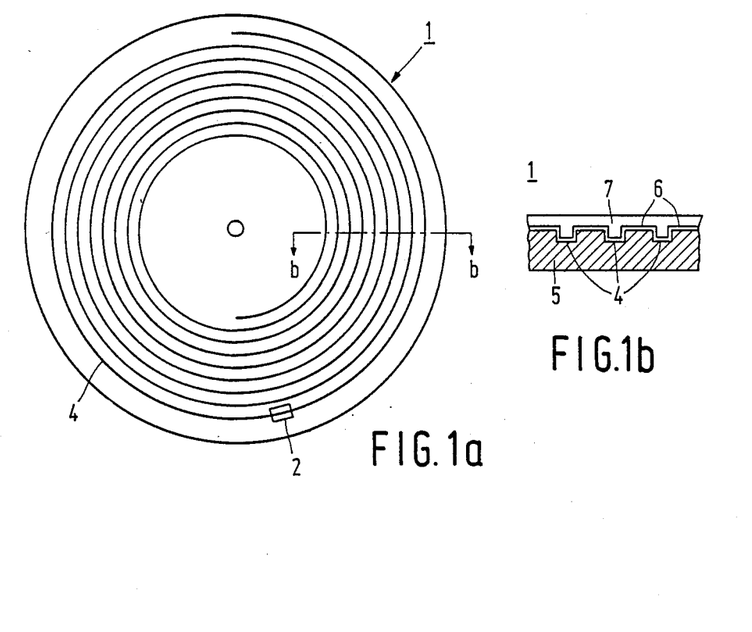
FIGS. 1a, 1b, 1c and 1d shows an embodiment of a record carrier in accordance with the invention.
Figure 1C:
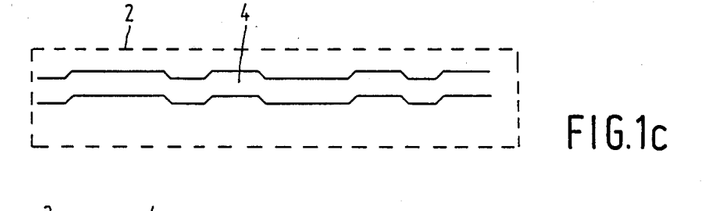
Figure 1D:
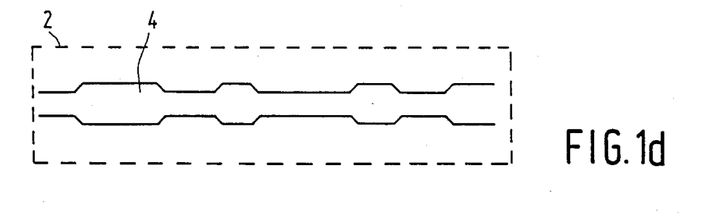

FIG. 1 shows possible embodiments of a record carrier 1 for use in the system in accordance with the invention, FIG. 1a being a plan view, FIG. 1b showing a small part of a sectional view taken on the line b—b, and FIG. 1c and FIG. 1d being highly enlarged plan views of a part 2 of a first and a second embodiment of the record carrier 1. The record carrier 1 has thereon an a track 4 in the form of a preformed groove. The track 4 is intended for recording a digtal information signal Vi. For the purpose of recording the record carrier 1 is provided with a recording layer 6 which is deposited on a substrate 5 and which is covered with a radiation-transmitting protective coating 7. The recording layer 6 is of a material which, when exposed to suitable radiation, is subjected to an optically detectable change. Such a layer may comprise, for example, a thin metal layer such as tellurium. By means of laser radiation of sufficiently high intensity this metal layer can be melted locally, as a result of which this layer is locally given another reflection coefficient, so that when an area thus formed is scanned by a radiation beam the reflected beam is amplitude-modulated in conformity with the recorded information. Alternatively, the layer 6 may consist of the radiation-sensitive materials as described, for example, in the book "Principles of Optical Disc Systems", Adam Hilgar Ltd., Bristol and Boston, pages 210–227.

The groove comprising the track 4 may be employed as a servo track, enabling a radiation beam projected on the record carrier for recording the information to be accurately incident on the track 4 constituted by the groove, i.e. enabling the position of the radiation beam in a radial direction to be controlled by a tracking system utilizing the light reflected from the record carrier 1. The tracking system for controlling the radial position of the radiation spot on the record carrier may be one of the systems described in the aforementioned book "Principles of Optical Disc Systems".

Figure 2:
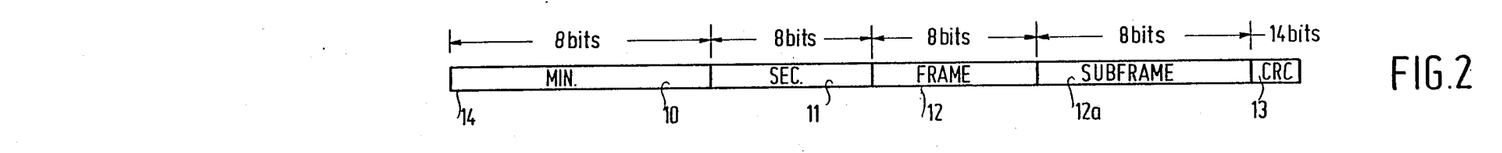
FIG. 2 shows an example of a position-information code.

For identifying the position of the radiation spot on the track 4 a position-identifying signal Vp is recorded in the track 4 by means of a preformed track modulation, for example a track undulation as is shown in FIG. 1c. However, other track modulations such as for example track-width modulation (FIG. 1d) are also suited for this purpose. The position information represented by the position-information signal Vp may comprise a binary position-identifying code (PIC), for example in the form of a time code which indicates the time needed to cover the distance from the beginning of the track to the position where the position-information signal is located during scanning at the nominal scanning velocity. Such a time code may comprise, for example, a plurality of consecutive bits, as for example used in recording EFM-modulated information on CD and CD-ROM discs. FIG. 2 shows a modification of the time code used in CD and CD-ROM, comprising a first portion 10 indicating the time in minutes, a second portion 11 indicating the time in seconds, a third portion 12 indicating a frame number, a fourth portion 12A indicating a subframe, and a fifth portion 13 comprising a plurality of correction bits.

Figure 3A:
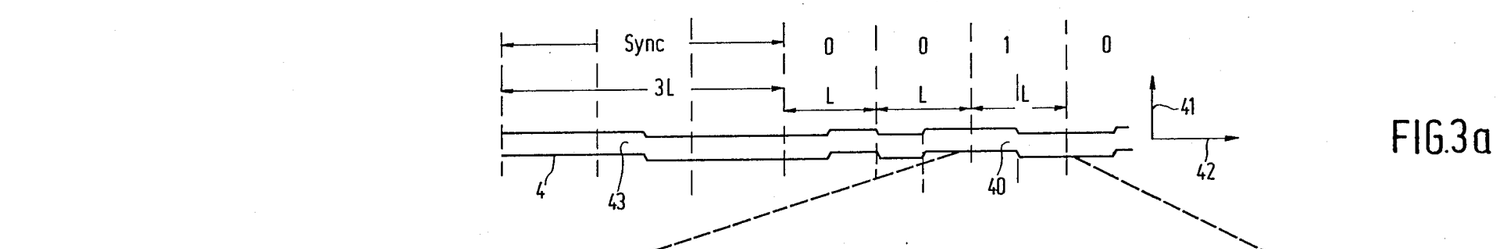
FIGS. 3a, 3b and 3c show an example of the track modulation corresponding to the position-identifying signal.

FIG. 3a is the plan view of a part of a track 4 which exhibits a track undulation corresponding to a "biphase" modulated position-information signal $V_p$. The track 4 comprises track portions 40 having a length L, each representing one bit of the position-information code (PIC). A bit of the logic value "1" is represented by a track portion 40 having a positive track excursion in a direction perpendicular to the track direction 42 over a first portion having a length ½ L, followed by a second portion also having a length ½ L and having a negative track excursion. A bit of the position-information code (PIC) of logic value "0" is represented by an opposite track undulation pattern, i.e. it comprises a first portion of a length ½ L with a negative track excursion, followed by a second portion of a length ½ L with a positive track excursion.

The track portion 40 which indicates the first bit of a position-information code is preceded by a synchronization track portion 43 having a track undulation of a shape which can be distinguished from the shape for the track undulation at the location of the track portions 40 representing the bits of the position-information code (PIC).

The synchronization track portion 43 shown in FIG. 3a comprises a first portion having a length of 1½ L with a positive track excursion, followed by a second portion also having a length of 1½ L with a negative track excursion. Since in the track portions 40 the length of a track portion with a positive or negative track excursion is always equal to L or 2L, the beginning of each position-information code (PIC) is marked unambiguously by the synchronization track portion 43.

Figure 3B:
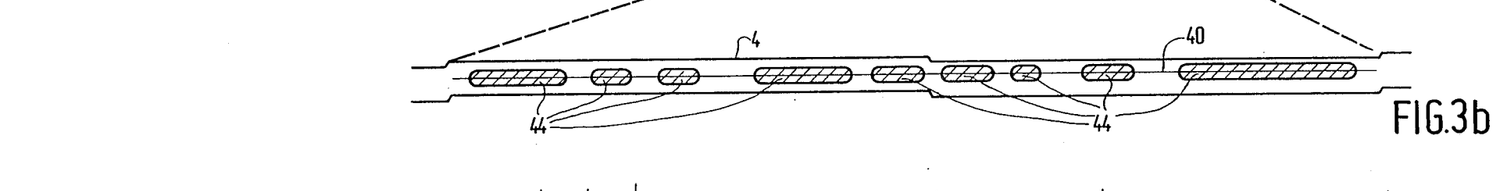
Figure 3C:
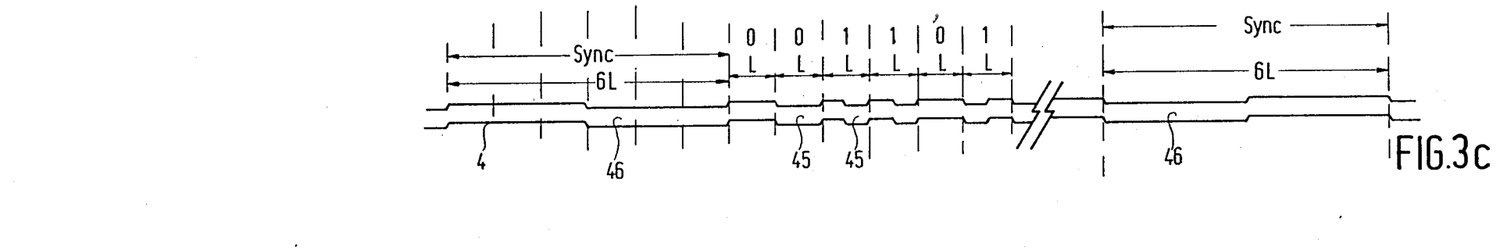

FIG. 3c is a plan view of a part of the track 4 which exhibits a track undulation corresponding to a "biphase-mark" modulated position-information signal Vp. In such a modulation the track 4 is again divided into track portions 45 of a length L, each representing one bit of the position-information code (PIC). In this modulation the excursion at the location of the boundaries between the track portions 45 always exhibits a reversal of direction.

A bit of the logic value "0" is represented by a track portion having an excursion whose direction does not change within the entire track portion 45. A bit of the logic value "1" is represented by a track portion in which the direction of the excursion is reversed. The time-information code is again preceded by a synchronisation track portion 46 which can be extinguished from the track portions 45 and which has a length which is six times the length L of the track portions 40, the direction of the excursion being reversed halfway the synchronisation-track portion. Instead of the radial track modulations shown in FIGS. 3a and 3c the time code can be represented similarly by the track-width modulation shown in FIG. 1d.

Figure 4:
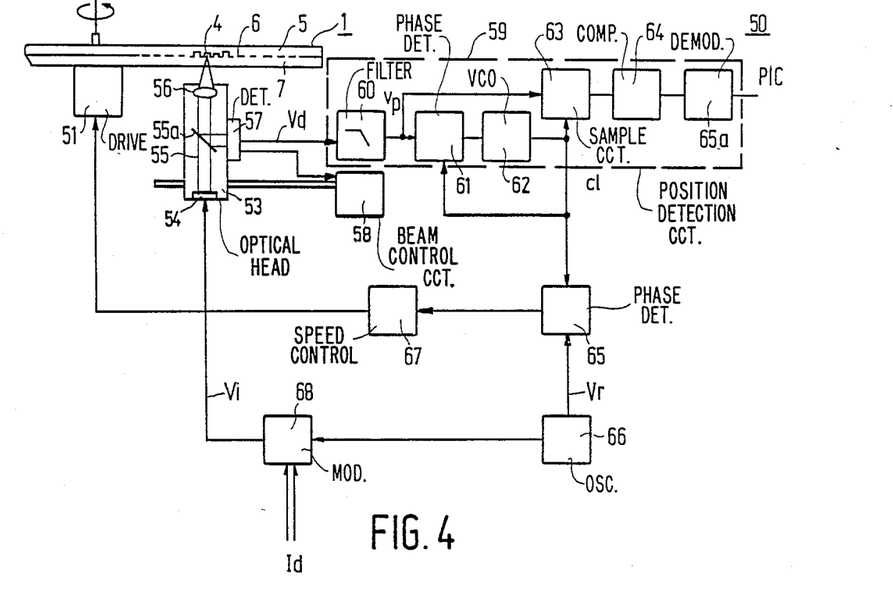
FIG. 4 shows a recording and/or read apparatus in accordance with the invention.

FIG. 4 shows a recording and/or read apparatus 50 for recording and reading the record carrier 1. The apparatus 50 comprises a motor 51 for rotating the record carrier 1 about an axis 52. An optical write/read head 53 of a customary type is arranged opposite the record carrier 1. The write/read head 53 comprises a radiation source in the form of a laser 54 for generating a radiation beam 55, and an objective 56 by means of which the radiation beam 55 can be forcussed to form a tiny scanning spot on the recording layer 6.

The read/write head 53 can be operates in two modes, namely: a first mode (read mode) in which the laser 54 generates a radiation beam of constant intensity which is inadequate to produce an optically detectable change in the recording layer 6, and a second mode (recording mode) in which the radiation beam 53 is modulated in conformity with an information signal to be recorded in order to form a pattern of recording marks 44 having changed optical properties in conformity with the information signal Vi in the recording layer 6 at the location of the track 4 (see FIG. 3b).

The beam which is reflected by the track 4 is passed to a radiation-sensitive detector 57 of a customary type via a semi-transparent mirror 55a. The detector 57 is constructed to generate a tracking-error signal which indicates the position of the radiation spot relative to the track 4. The tracking-error signal is applied to a radial-position control circuit 58 which ensures that the radiation beam 55 remains on the track 4. Moreover, the detector 57 detects the intensity modulation caused by the track modulation in the radiation beam reflected by the record carrier 1. The detector 57 supplies a detection signal Vd corresponding to the detected intensity modulation.

Figure 5:
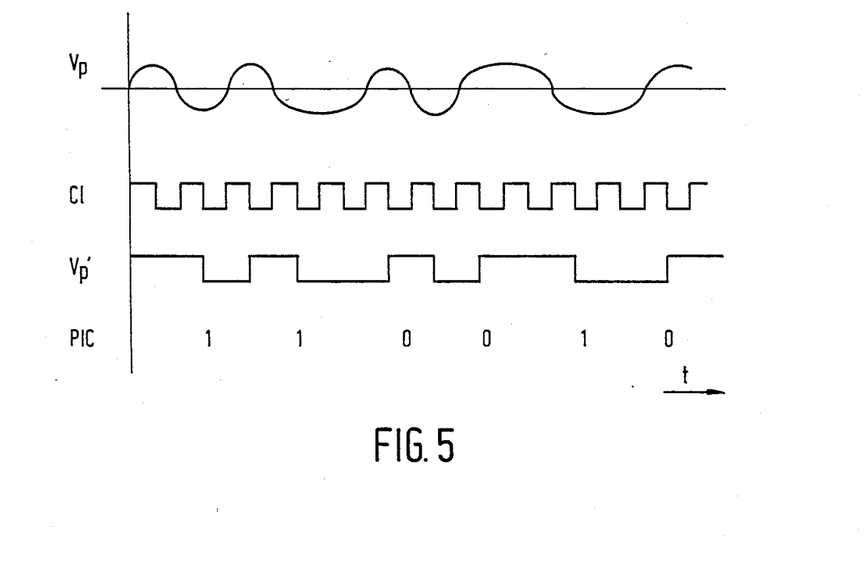
FIG. 5 shows some signal occurring in the recording and/or read apparatus of FIG. 4 as a function of time.

The position-information code (PIC) represented by the preformed track modulation is recovered from the detection signal Vd by a detection circuit 59. For this purpose the detection circuit 59 comprises a band-pass filter 60 which is adjusted in such a way that when the track 4 is scanned with the nominal scanning velocity it almost exclusively transmits the position-identifying signal Vp (see FIG. 5) corresponding to the preformed track modulation. By means of a customary phase-locked loop circuit, comprising a phase detector 61 and a voltage-controlled oscillator 62, a clock signal c1 (see FIG. 5) which is in synchronism with the position-identifying signal Vp is derived from the signal Vp.

By means of a sampling circuit 63 which is controlled by the clock signal and a comparator circuit 64 the position-identifying signal Vp is converted into a binary signal Vp' (see FIG. 5), from which the individual bits of the position-information codes (PIC) are recovered by means of a "biphase" demodulator 65A of a customary type.

The frequency of the clock signal c1 is proportional to the velocity with which the track 4 is scanned, so that this clock signal c1 can be used as a measurement signal for the purpose of controlling the scanning velocity. In the embodiment shown, this velocity control is achieved in that a phase detector 65 compares the phase of the clock signals c1 with the phase of a periodic reference signal Vr of constant frequency fr which is generated by an oscillator 66. By means of a control circuit 67 the speed of the motor 51 is controlled at a value for which the phase difference determined by the phase detector 65 remains substantially zero, so that the scanning velocity of the disk is maintained constant at a value dictated by the frequency fr. If by means of the read/write apparatus 50 an information signal Vi supplied by a modulator 68 is to be recorded in a portion of the track 4 defined by a selected position-information code, the desired track portion can be located prior to recording by means of the position-information codes (PIC) read in the read mode. As soon as the desired track portion has been located, the read/write head 53 can be operated in the write mode, the radiation beam 55 then being modulated in conformity with the information signal Vi to be recorded.

FIG. 3b, by way of example, shows a pattern of recording marks 44 with modified optical properties, arising during recording of, for example, an information signal Vi which is an EFM-modulated by modulator 68 in conformity with the CD standard. The frequency spectrum of such an EFM-modulated information signal is indicated by the reference numeral 30 in FIG. 6.

As is apparent from FIG. 6, the EFM-modulated information signal Vi does not exhibit any strong frequency components below 100 kHz.

The track modulation representing the position-identifying signal Vp is dimensioned in such a way that the frequency spectrum of the position-identifying signal Vp read at the nominal scanning velocity does not exhibit any strong frequency components in the frequency range Be occupied by the information signal Vi to be recorded. The frequency spectrum of the position-identifying signal Vp bears the reference numeral 31 in FIG. 6. If the position-information signal is "biphase" or "biphase-mark" modulated as in the embodiments described above, the frequency spectrum of the position-identifying signal Vp does not exhibit any strong frequency components situated within the frequency band Br used for scanning velocity control (indicated by the reference numeral 32).

Figure 6:
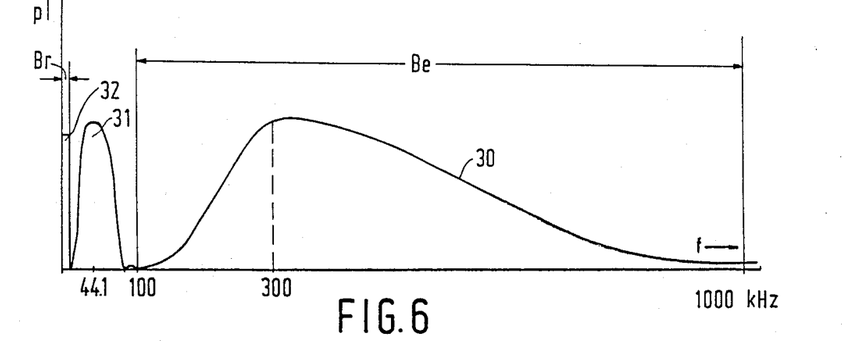
FIG. 6 shows the frequency spectra of the information signal and the position-identifying signal, and the frequency band used for scanning-velocity control.

If the frequency spectra 30 and 31 do not overlap, as is indicated in FIG. 6, the position-identifying signal Vp and the information signal Vi can always be read simultaneously without any significant interaction, so that it is also possible to read the position-information codes (CIP) during recording of the information signal or during reading of a signal already-recorded. Moreover, as the frequency spectrum 31 exhibits substantially no frequency components within the frequency band Br, scanning-velocity control is not influenced by the position-identifying signal Vp. If the recorded signal is an EFM modulated signal in conformity with the CD-standard, a position-identifying signal which is in sycnhronism with a 22.05-kHz or 44.1-kHz clock signal is very suitable.

Since for such an EFM modulation the repetition frequency of the data words is 44.1 kHz, the recording apparatus must comprise a 44.1 kHz frequency source, so that the reference signal Vr for scanning-velocity control may be derived from this frequency source, which is available anyway. The frequency spectrum 31 in FIG. 6 corresponds to the spectrum of a signal which is "biphase" modulated with a clock frequency of 44.1 kHz.

In the embodiment of the record carrier described in the foregoing the preformed track modulation corresponds to a "biphase" or "biphase-mark" modulated position-identifying signal Vp. However, it will be evident that, in principle, any track modulation is suitable, which corresponds to a position-identifying signal Vp having a frequency spectrum which does not overlap the frequency spectrum of the information signal Vi. If a measurement signal for scanning-velocity control is derived from the position-identifying signal Vp, it is moreover required that the frequency spectrum of the position-identifying signal does not comprise any strong frequency components within the frequency band used for scanning-velocity control.

Figure 7:
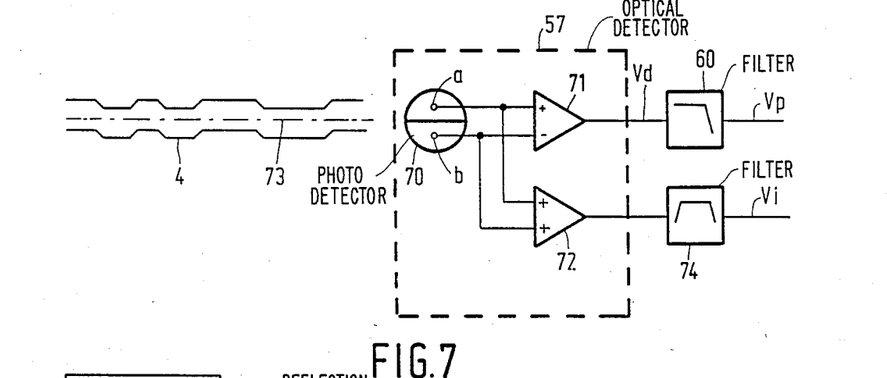
FIG. 7 shows an example of the detector used in the recording and/or read apparatus of FIG. 4.

When a track modulation in the form of a track undulation is employed a very satisfactory signal separation between the information signal Vi and the position-identifying signal Vp during read-out can be obtained by means of the optical detector 57 shown in FIG. 7. The detector 57 comprises a photodetector 70 which is divided in two parts a and b along an axial line. A differential amplifier 71 supplies a difference signal representing the difference between the amounts of radiation of the modulated beam 55 detected by the parts a and b. A summing amplifier 72 supplies a sum signal, which is representative of the sum of the amounts of radiation detected by the parts a and b.

Generally, the bandwidth of the tracking control is too small to enable the track undulation to be followed. In that case the track 4 will be scanned in such a way that the centre of the scanning beam 55 follows a path 73 which is respresentative of the average position of the centre of the track 4. The modulation of the radiation beam produced by the track undulation will be represented strongly in the signal on the output of the differential amplifier 71, whilst the modulation caused by the recorded information signal will be represented in particular in the signal on the output of the summing amplifier. A filter 74 rejects the frequency components situated outside the frequency range occupied by the information signal Vi, so that the signal Vi on the output of the filter 74 almost exclusively comprises the frequency components of the information signal Vi.

Similarly, the filter 60 removes undesired frequency components from the position-identifying signal Vp. The position-identifying signal Vp is very suitable for locating the track portion desired for recording the information signal Vp. However, said signal is also useful for detecting undesired track jumps, for example as a result of mechanical vibrations. A track jump can be detected by means of the position-information codes (PIC) read consecutively. If two consecutive position-information codes (PIC) do not adjoin each other, this means that a track jump has occurred. The above method of recording position-information codes enables a very fast detection of undesired track jumps to be effected, because the number of position-information codes recorded per unit of time is very high in comparison with the number of time codes recorded per unit of time in CD or CD-ROM systems.

Figure 8:
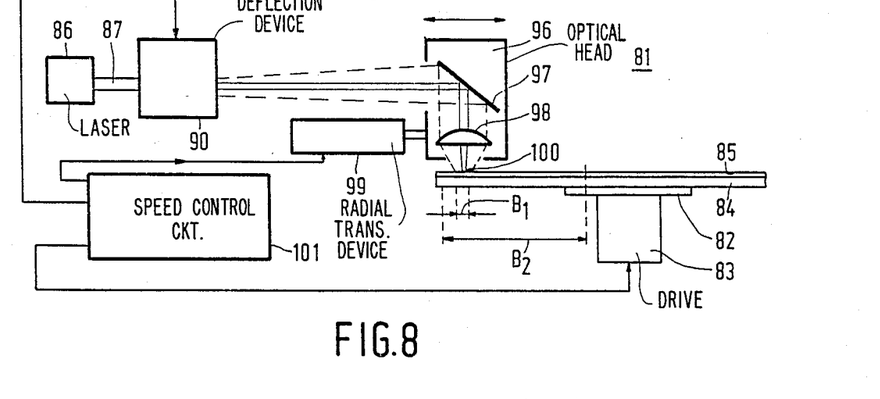
FIG. 8 shows an apparatus for manufacturing the record carrier in accordance with the invention.

FIG. 8 shows an embodiment of an apparatus for manufacturing a record carrier in accordance with the invention. The apparatus 81 comprises a turntable 82 which can be rotated by a drive means 83. A disc-shaped record carrier 84, for example a flat glass disc provided with a light-sensitive layer 85, for example in the form of a photoresist, can be placed on the turntable 82.

A laser 86 generates a light beam 87 which is projected onto the light-sensitive layer 85. The light beam 87 is first passed through a deflection device 90. The deflection device 90 is of a type by means of which a light beam can be deflected very accurately within a small range. The deflection device may be, for example, a mirror which can be pivoted through a small angle, an electro-optical deflection device or an acousto-optical deflection device. In FIG. 8 the limits of the deflection range are indicated in broken lines. The light beam 87 deflected by the deflection device 90 is passed to an optical head 96. The optical head 96 comprises a mirror 97 and an objective 98 for focusing the light beam onto the light-sensitive layer 85. The optical head 96 is movable in a radial direction relative to the rotating carrier 84 by means of a radial translation device 99.

By means of the optical system described herein the light beam 87 is focused to form a scanning spot 100 on the light-sensitive layer 85, the position of said scanning spot 100 being dependent on the magnitude of the deflection of the light beam 87 produced by the deflection device 90 and the radial position of the write head 96 relative to the carrier 84. In the shown position of the optical head 16 the scanning spot 100 can be moved within a range B1 by means of the deflection device 90.

By moving the optical head 96 the target point can be moved within a range B2 by means of the deflection device shown.

A control circuit 101, for example a computer system, enables the speed of the drive means 83 and the radial velocity of the radial translation actuating device 99 to be controlled in a customary manner, in such a way that the light-sensitive layer 85 is scanned by the radiation beam 87 with a constant scanning velocity in accordance with a spiral path. Such controlling system is described in detail in the Dutch patent application No. 8701448 filed Jun. 22, 1987, which corresponds to U.S. application Ser. No. 099,658, filed Sept. 22, 1987. The control circuit 101 further generates the position-identifying signal Vp. The signal Vp comprises a signal (see FIG. 9) which is in synchronism with a clock signal, i.e. the spacings between the zero crossings of the position-information are equal to a predetermined time interval T/2 or a multiple thereof.

The waveform of the position-identifying signal Vp is selected in such a way that its frequency spectrum does not exhibit any strong frequency components situated within the frequency range intended for recording the information signal Vi.

The position-identifying signal Vp represents the position information, which comprises for example a time code as shown in FIG. 2, which continually indicates the time which has expired since scanning has started.

Figure 9:
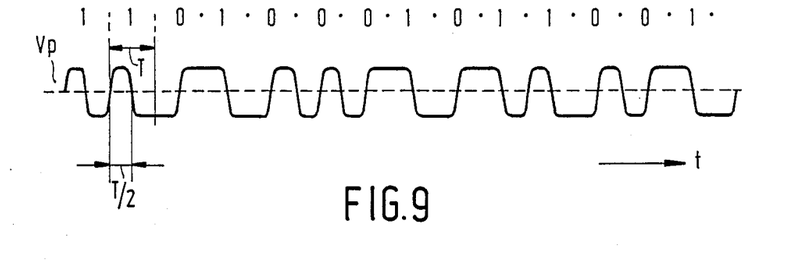
FIG. 9 shows an example of the position-information signal.

The position-identifying signal Vp shown in FIG. 9 exhibits a "biphase" modulation. Here the position-information code (PIC) is converted into a synchronous signal which is positive for the time interval T/2 and negative for the next time interval T/2 for a logic "1" of the position-information code (PIC). A ligic "0" yields exactly the opposite binary signal, i.e. negative for the time interval T/2 and position for the next time interval T/2.

As already stated, a "biphase"modulated signal has the advantage that it does not exhibit any strong frequency components in the low-frequency range, so that the position-identifying signal Vp may be utilized for velocity control of the record carrier 1. The position-identifying signal Vp is used to control the deflection device 90, so that the scanning point 100 will perform a radial undulation relative to the path defined by the position of the optical head 96, the instantaneous radial excursion corresponding to the instantaneous signal value of the signal Vp.

Figure 10:
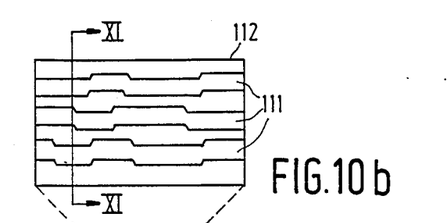
FIGS. 10a, 10b and 11 show another embodiment of a record carrier in accordance with the invention.
Figure 11:
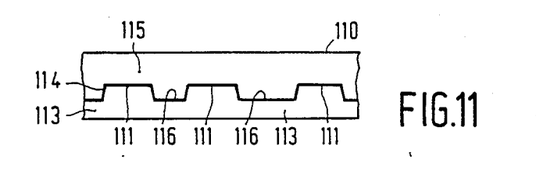

After the light-sensitive layer 85 has been scanned in the manner described above it is subjected to an etching process, the parts of the layer 85 which have been exposed to the radiation beam 87 being removed, yielding a master disc formed with a groove which exhibits a radial undulation corresponding to the information signal Vp. Subsequently, replicas are made of this master disc and are provided with the recording layer 6. The record carrier thus obtained has a track in the form of a groove. When signal Vi is recorded the information it forms in the groove a corresponding pattern of recording markes. However, in practice it has been found that a better signal-to-noise ratio is obtained if the information signal is recorded in a track formed by a ridge instead of a groove. Such a record carrier 110 is shown in FIGS. 10a and 10b. The tracks in the form of ridges 111 are shown only diagrammatically in FIG. 10a and they are shown to a strongly enlarged scale in an area 112 in FIG. 10b. FIG. 11 is a sectional view taken on the line XI—XI within the area 112 of the record carrier 110, which comprises a substrate 113, a recording layer 114, and a transparent coating 115.

As in the record carrier 110 the diameter of the grooves 116 situated between the ridges 111 changes as a result of the radial undulation of the ridges 11, the method of manufacturing differs from the method of manufacturing record carriers having a track pattern comprising grooves of constant width, as described above with reference to FIG. 8.

A track pattern of ridges of constant width can be obtained by means of a method which bears much resemblance to the method described with reference to FIG. 8. However, in this case the light-sensitive layer 114 must consist of a negative photoresist instead of a positive photoresist. During development of a layer consisting of such a negative photoresist the non-exposed portions of the photoresist are removed instead of the exposed portions as in the case of the customary positive photoresist, after which a master disc with the desired track pattern of ridges is obtained, of which subsequently replicas can be made in the customary manner.

The record carrier with a track pattern of ridges of constant width can also be obtained starting from a substrate 84 with a light-sensitive layer 85 consisting of the customary positive photoresist, from which the exposed portions are removed during development. In that case the carrier 84 is provided with a track pattern of grooves of constant width which is the complement of the desired track pattern of constant-width ridges. The winding sense of such a complementary track pattern of groove is opposed to that of the desired track pattern. This means that for obtaining the carrier with an opposite track pattern the direction of rotation of the carrier 84 during recording must be opposite to the direction of rotation desired during reading of the record carrier 110. The process of recording the carrier 84 can be controlled in the same way as described with reference to FIG. 8.

What is claimed is:

1. Apparatus for recording and/or reading an information signal in an elongated track on an optical record carrier, which track is modulated by a periodic position-identifying signal having a frequency which is synchronous with a clock signal, said position-identifying signal identifying the locations of successive positions along said track; such apparatus comprising means for scanning said track with a beam of radiation which is reflected therefrom, optical detecting means for detecting the reflected beam and generating a detection signal corresponding to the modulation of such beam caused by the track modulation, and a detection circuit for deriving said position-identifying signal from said detection signal; characterized in that:
   said position-identifying signal comprises successive digital code signals at successive locations on said track the same as those where said information signal is recorded thereon, each digital code signal being in the form of modulated excursions of said track in a direction substantially transverse thereto; and
   said position-identifying signal is in a frequency band substantially outside the frequency band of said information signal.

2. A system as claimed in claim 1, characterized in that said detection circuit comprises a filter having a pass-band which substantially corresponds to the frequency band of said position-identifying signal.

3. A system as claimed in claim 1, further comprising a clock-regeneration circuit for recovering said clock signal from said position-identifying signal, and a control circuit producing a signal for controlling the scanning velocity of said scanning means so that the frequency of said clock signal remains equal to a predetermined reference frequency; the frequency band of such velocity control signal being substantially outside the frequency band of said position-identifying signal.

4. A system as claimed in any of claims 1-3, characterized in that said position-identifying signal is a biphase modulated signal.

5. A system as claimed in any of claims 1-3, characterized in that said position-identifying signal is a biphase-mark modulated signal.

6. A method of manufacturing an optical record carrier on which an information signal is to be recorded in a radiation-sensitive track thereon, which track is modulated in accordance with a periodic position-identifying signal identifying the locations of instantaneous positions along said track; such method comprising:
   scanning said record carrier with a radiation beam which traverses a scanning path corresponding to a desired pattern of said track on said record carrier and having a substantially constant scanning velocity;
   modulating said radiation beam with said position-identifying signal during such scanning, such position-identifying signal comprising successive digital code signals at successive positions on said track the same as those where said information signal is to be recorded thereon, each code signal digitally modulating the excursion of the track in a direction substantially transverse thereto, said position-identifying signal being in synchronism with a clock signal having a frequency corresponding to the scanning velocity of said radiation beam; and
   providing said position-identifying signal in a frequency band which is substantially outside the frequency band of the information signal to be recorded on said track.

7. A method as claimed in claim 6, characterized in that the frequency band of said position-identifying signal is substantially above the frequency band of variations in the frequency of said clock signal caused by variations in the scanning velocity of said radiation beam.

8. A method as claimed in claim 6, characterized in that said position-identifying signal is a biphase modulated signal.

9. A method as claimed in claim 6, characterized in that said position-identifying signal is a biphase-mark modulated signal.

10. Apparatus for manufacturing an optical record carrier for recording an information signal in a radiation-sensitive elongated track thereon, which track is modulated by a periodic position-identifying signal identifying the locations of successive positions along said track; such apparatus comprising:
   an optical system for scanning said record carrier with a radiation beam which traverses a scanning path which forms said track in a desired pattern thereon;
   means for generating said position-identifying signal in synchronism with a clock signal, said position-identifying signal comprising successive digital code signals at successive positions on said track the same as where said information signal is to be recorded thereon; and means for modulating said radiation beam in accordance with said, code signals during said scanning of the record carrier, each code signal digitally modulating the excursion of the track at its position in a direction substantially transverse to the track;

said position-identifying signal being in a frequency band which is substantially outside the frequency band of the information signal to be recorded on said track.

11. Apparatus as claimed in claim 10, characterized in that the frequency of said clock signal corresponds to the scanning velocity of said radiation beam, and said position-identifying signal is generated in a frequency band substantially entirely above the frequency band of variations in the frequency of said clock signal caused by variations in the scanning velocity of said radiation beam.

12. An apparatus as claimed in claim 11, characterized in that said position-identifying signal is a biphase modulated signal.

13. An apparatus as claimed in claim 11, characterized in that said position-identifying signal is a biphase-mark modulated signal.

14. A record carrier having on a surface thereof an optically readable elongated track on which information may be recorded or read by read/record apparatus which scans such track with a beam of radiation; characterized in that:

excursions of said track in a direction substantially traverse thereto are digitally modulated at successive positions on said track in accordance with a position-identifying signal comprising successive digital position code signals which identify the locations of such positions on said track, whereby the locations of information recorded in such positions are identified; and said transverse excursions of said track are further digitally modulated at said positions in accordance with synchronizing signals included in said position-identifying signal between the successive digital position code signals, such synchronizing signals enabling the read/record apparatus to maintain a constant scanning speed of said beam of radiation on said track.

15. A record carrier as claimed in claim 14, wherein the digital modulation of said track produces a digital variation of the width of said track.

16. A record carrier in accordance with claim 14, wherein the digital modulation of said track produces a digital variation of the position of the center line of said track.

* * * * *